United States Patent [19]

Anderson

[15] 3,663,105
[45] May 16, 1972

[54] METHOD AND APPARATUS FOR MEASURING RANGE UTILIZING SUPERIMPOSITION OR ALIGNMENT OF IMAGES

[72] Inventor: Alton D. Anderson, 2360 Ridge Drive, Northbrook, Ill. 60062

[22] Filed: June 28, 1967

[21] Appl. No.: 649,520

[52] U.S. Cl. ................................................................356/4
[51] Int. Cl. ..........................................................G01c 3/08
[58] Field of Search ................................356/4, 51, 141, 152

[56] References Cited

UNITED STATES PATENTS

| | | | |
|---|---|---|---|
| 2,930,278 | 3/1960 | Hansen et al. | 356/5 |
| 3,381,569 | 5/1968 | Hatcher | 356/152 |
| 3,435,744 | 4/1969 | Stimson | 356/4 UX |

Primary Examiner—Rodney D. Bennett, Jr.
Assistant Examiner—J. M. Potenza
Attorney—Mason, Kolehmainen, Rathburn & Wyss

[57] ABSTRACT

There is provided an apparatus and method for automatically reading out the range as determined by dual image optical range finders. Such dual image optical range finders produce a pair of misaligned images when the set range of the range finder differs from the actual range of a distant object, and the images are superimposed or aligned when the set range and actual range correspond. Passing the projected image of the range finder through one or more moving slits to shutter the projected image will form image pulses, the separation of which represents the error between the set and actual range of the range finder. A light detector, such as photoelectric cells, converts the image pulses into electrical pulses and an electrical circuit system is provided to detect the differences between the conditions of exact image alignment and the alignment error.

12 Claims, 10 Drawing Figures

PATENTED MAY 16 1972
3,663,105
SHEET 1 OF 4
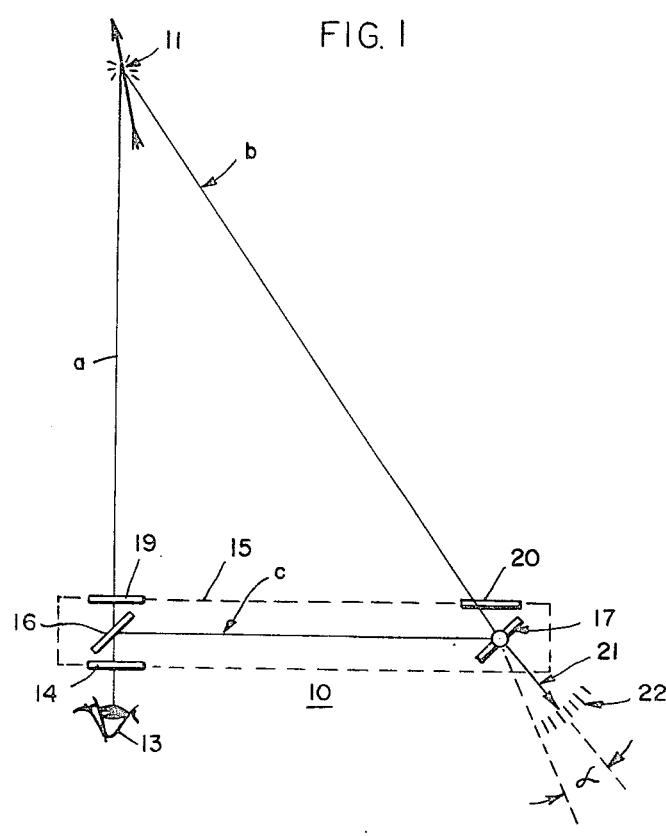
FIG. 1
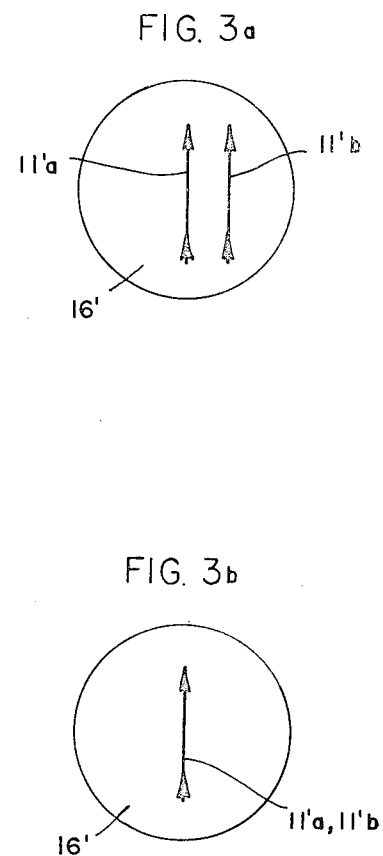
FIG. 3a
FIG. 3b
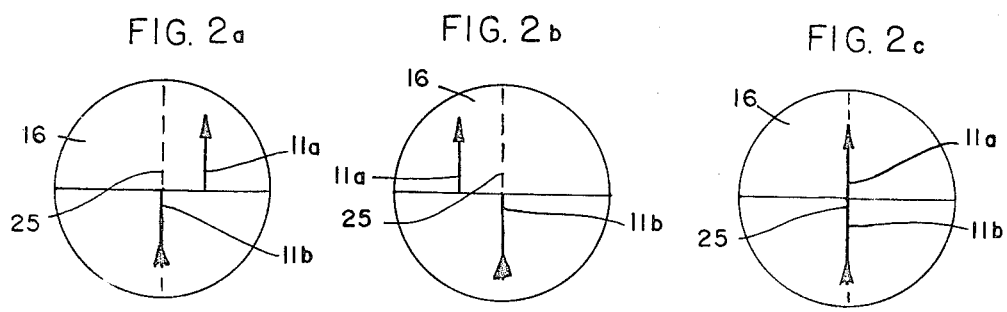
FIG. 2a   FIG. 2b   FIG. 2c
INVENTOR:
ALTON D. ANDERSON
BY
*Mason, Kolehmainen, Rathburn & Wyss*
ATT'YS

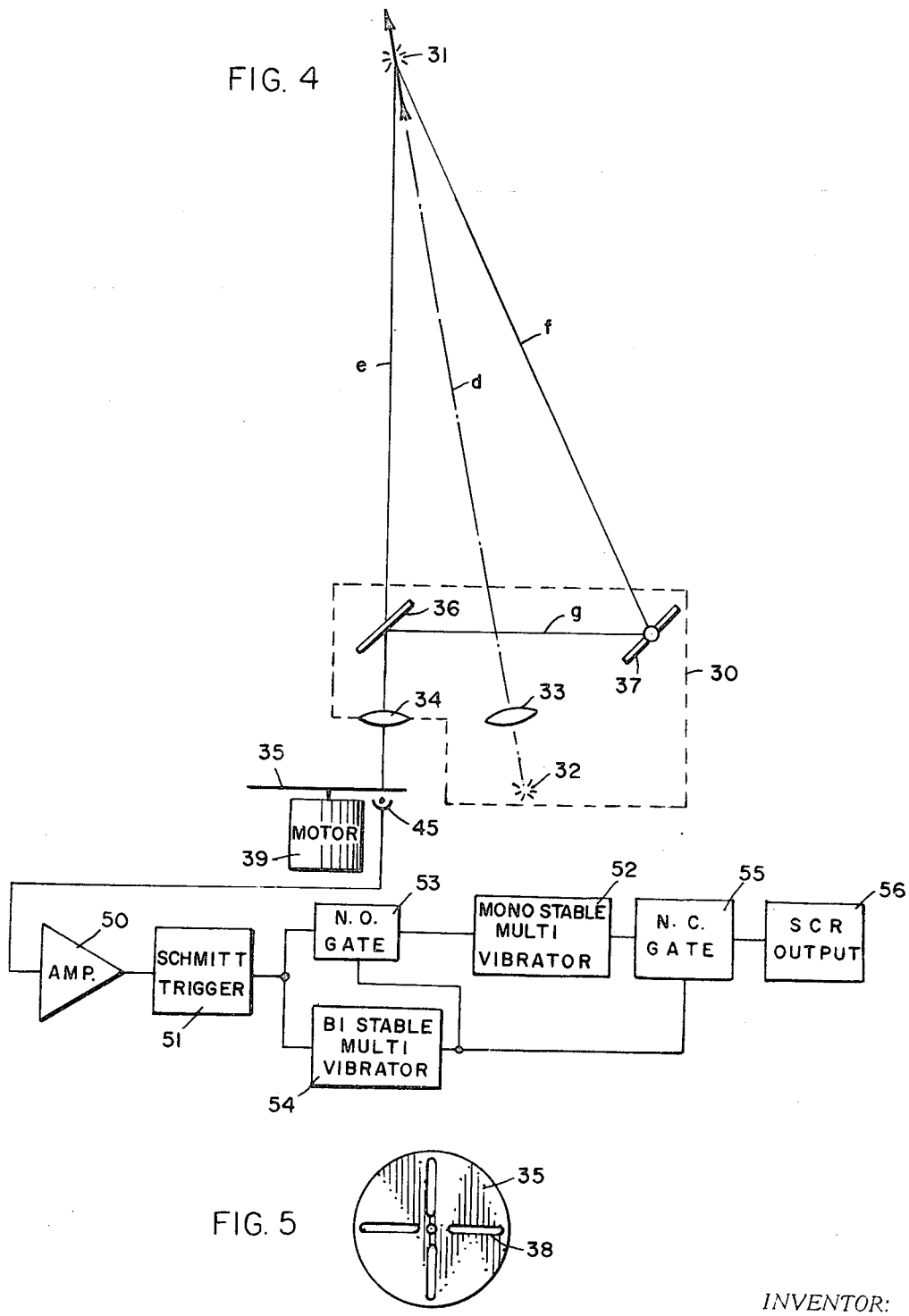

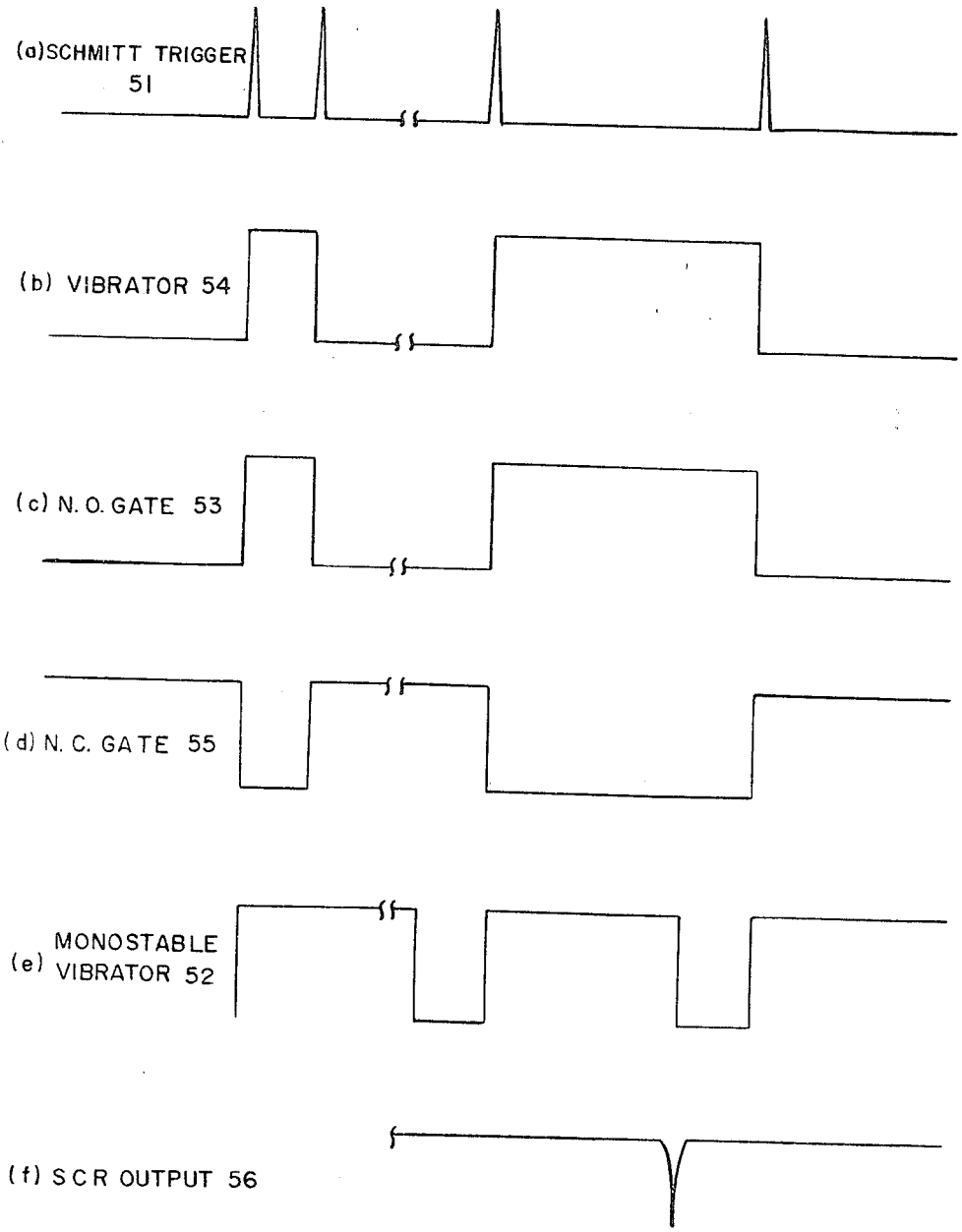

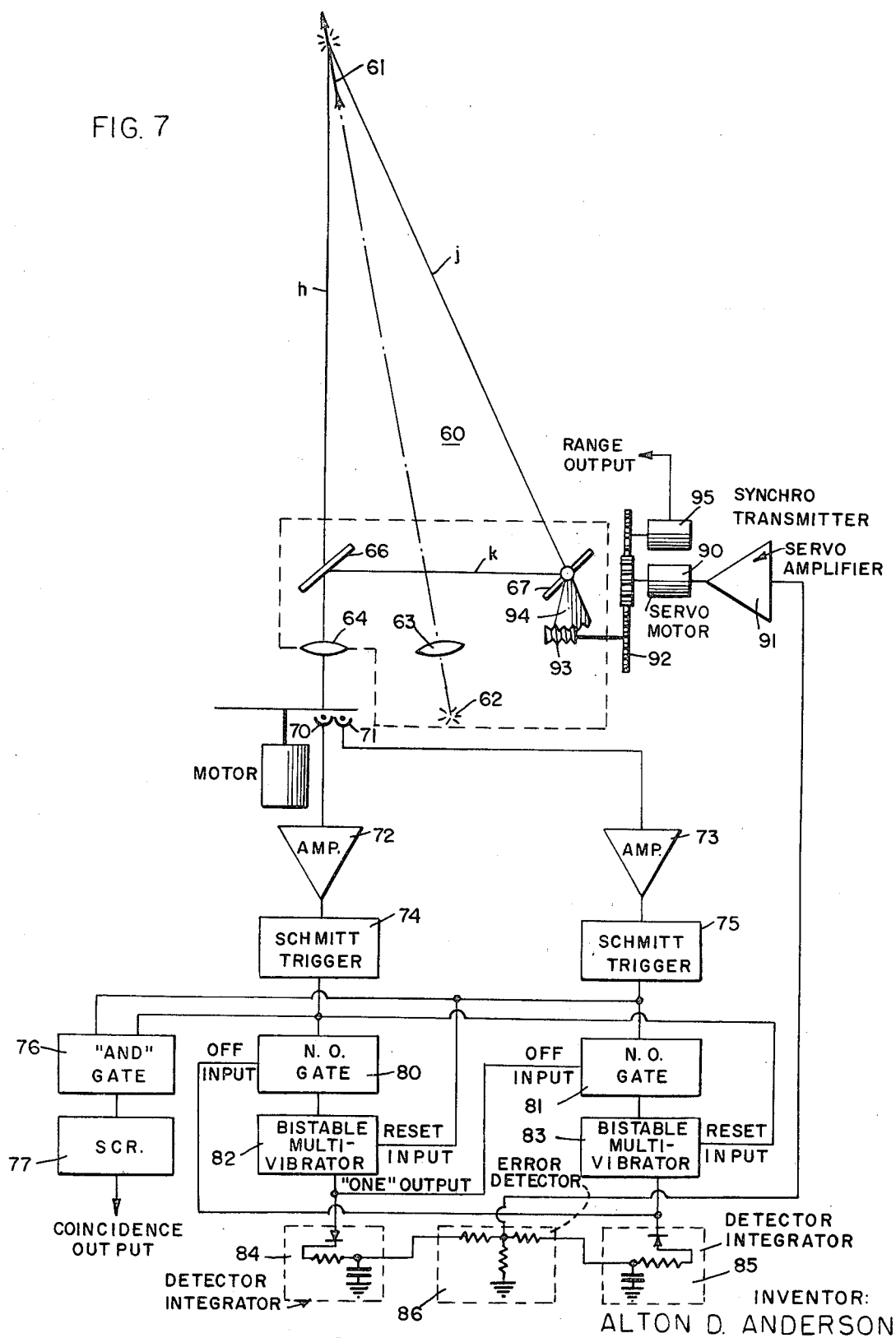

METHOD AND APPARATUS FOR MEASURING RANGE UTILIZING SUPERIMPOSITION OR ALIGNMENT OF IMAGES

This invention relates to a method and apparatus for measuring space range, such as distance or angle, from one location to another or to a distant object. It also relates to angular measurement optical systems such as the split image transit that measures angular displacement relative to a pre-established reference line.

Ranges or distances are often measured automatically by using microwave (radar) or Laser devices. Many expensive automatic methods have been sought for precisely measuring set ranges (for example in the range of less than 100 yards) and various acoustic techniques have been tried in addition to the radar and Laser approaches. None have proved entirely successful. All are either too expensive, too unreliable, or both.

The present invention was made as a result of the recognition of the need for a reliable, inexpensive, precise short range space measuring device for use in spacecraft rendezvous. In this application two spacecraft approach each other slowly in an attempt to link together, and accurate measurement of range at short distance is needed. However, the present invention has applications outside of linking of spacecraft. For example, the present apparatus and method may be used as an initiator for retro rockets in automatically landing of a spacecraft or for parachute drops of cargo. The device may be preset to a specific distance and as the dropping vehicle approaches the ground the sensor therein will be in a condition that actual range exceeds set range until coincidence of the actual and set range occurs. At this time a suitable signal will be provided which will activate retro rockets or form other control functions. As a further example, the present range detector may be used for such applications as automatic focusing of photographic or television cameras. Moreover, although the application refers to measurement by light and images, it is not restricted to the visible spectrum, and it is anticipated that it will function equally in the ultraviolet and infrared areas. Thus the distance to some hot object may be accurately measured by infrared optics and infrared detectors according to the present invention.

Accordingly, one object of the present invention is to provide a new and improved optical range detector.

Another object of the present invention is to provide a new and improved method for optically determining range and automatically providing a signal indication thereof.

A further object of the present invention is to provide completely automatically operation of optical range detectors.

A further object of the present invention is to provide completely automatic operation of high precision range and/or space measurement systems.

A further object of the present invention is the provision of an electronic signal that is a known or predetermined function of range, distance, height, or angle with precision.

In accordance with these and many other objects of the present invention, there is provided a new and improved apparatus for measuring range, such as distance, height or angle, and automatically converting such range into an electronic signal that may have many applications. More specifically, the range measuring system includes an optical range detector receiving light rays from the distant object and providing a pair of images which are aligned when the set range on the range detector is equal to the actual range of the object, and which are misaligned when the set range and actual range are at a variance. Although light has been referred to, it is understood that by light is meant not only visible rays, but rays in the infrared and ultraviolet spectrums as well. The images projected by the optical range detector are passed through slits in a moving member to provide repetitive groups of image pulses which are in timed spaced relation as a function of the separation of the projections. Transducer means, such as photoelectric cells or other light detectors, convert the image pulses to timed electrical pulses. Any suitable electronic circuit may be used to read out the variance in the set and actual ranges.

In accordance with a particular feature of the invention, the distant object may be illuminated by a light source associated with the range measuring device.

The present invention also relates to a method for measuring range wherein a pair of projected images of a distant object are formed so that they are aligned when the set range of the range finder is the same as the actual range of the object, and are misaligned when error exists between the actual range of the object and the set range. Thus separate images are formed which are projected into narrow image pulses by passing them through a slit in a moving member. The spacing of the images may be detected and converted into timed electrical pulses.

For a better understanding of the present invention reference may be had to the accompanying drawings wherein:

FIG. 1 is a schematic representation of a known type range finder;

FIG. 2 is a plurality of illustrations showing the formation of images by a split view type range finder;

FIG. 3 is a plurality of illustrations showing the images formed by a superimposed image type range finder;

FIG. 4 is a schematic representation of an automatic readout range detection device according to the present invention;

FIG. 5 is a detail view of the moving body illustrating the slits in the device of FIG. 4;

FIG. 6 is a plurality of wave curves illustrating the operation of the electronic readout system of FIG. 4; and FIG. 7 is an adaptation of the present invention for automatic range adjustment operated by the error in the alignment of the projected images and illustrated as adapted on the split-image type of range measuring system.

The invention is most readily understood by considering its application to a known type of range finder. A known type of split-image range finder is, therefore, illustrated in FIG. 1, and the projected images thereof are illustrated in FIG. 2. As therein shown, there is provided a split-image range finder 10 adapted to a manually operated optical system that measures range of a remote object or location by the process of triangulation. In the use of the range finder, the eye 13 of the observer looks through a viewing window 14 in a case 15 of the range finder. The box 15 contains a fixed mirror 16 and a pivoted or rotatable mirror 17. The mirrors 16 and 17 are positioned behind suitable front windows 19 and 20, respectively. As indicated, the mirror 17 may be rotated about its vertical center line by moving a control lever 21. In a conventional range finder the lever 21 may also perform as a pointer illustrated on a scale 22 which may be calibrated to read object distance directly. The mirror 16 in a split-image type of range finder is actually a half mirror, extending only across an upper half of the windows 14 and 19, as best illustrated in FIGS. 2a, 2b and 2c.

In the range finder 10 the observer 13 looks at the object 11 through the viewing window 14. The bottom half of the window 14 is aligned with the front window 19 so that the observer's eye 13 may directly form an image of the object 11 by looking through both windows 14 and 19. The direct line from an observer's eye to the object is represented by the ray line a. The top half of the window 14 is covered by the fixed mirror 16 so that the observer's eye 13 sees the reflection of the object 11 through the window 20 reflected from the pivoted mirror 17 to the fixed mirror 16 and then to the eye 13 of the observer through the window 14. The ray line b is shown drawn from the object 11 directly to the center of the mirror 17. When the mirror 17 is rotated to an appropriate position, the ray is reflected along ray path c to mirror 16 and then reflected into the eye 13 of the observer.

The images formed by the range finder 10 are best illustrated in FIG. 2. An index line 25 is scratched on the surface of the viewing window 14 to serve as a reference. It is accurately aligned so as to be parallel to the center line of the mirrors 16 and 17. When mirror 17 is rotated into the position shown in FIG. 1, the observer sees the two images of the object, one exactly above the other as shown in FIG. 2c. Since the distance between the two mirrors 16 and 17 is known, the distance to the object may be determined from the formula $D = L \tan \alpha$ where $\alpha$ is the angular rotation of the plane of mirror 17 referred to its zero position. The zero position is where the plane of mirror 17 is precisely parallel to the plane of mirror 16 with the plane of mirror 16 being exactly 45° clockwise from a line drawn from the center of window 14 to the center of window 19; $L$ is the distance between the vertical center lines of mirrors 16 and 17; and $D$ is the distance from the center of mirror 16 to the object 11 along the ray line $a$.

When the two images are exactly aligned, one-half of the image 11$a$ is visible as the reflected image through the mirror 16 and 17, while the other half of the object 11, illustrated as 11$b$, is visible directly through the windows 14 and 19. When the two images are exactly aligned, both halves 11$a$ and 11$b$ of the image of object 11 are aligned as at FIG. 2$c$, and measurement of the angle $\alpha$ will give the tangent function of range described by the equation above. If the images appear as at FIG. 2$a$, with the upper half 11$a$ of the image being to the left of the lower half 11$b$ thereof, then the angle $\alpha$ is too small and must be increased. It might also be said that the actual range $D$ is less than the distance for which the range finder is set, or set range. If the image halves 11$a$ and 11$b$ appear as in FIG. 2$b$, then the angle $\alpha$ is too great and must be decreased. In this case the actual range is greater than the set range.

The present invention may also be used for a superimposed type of range finder. Such a range finder may be identical with that illustrated in FIG. 1, except that the mirror 16 is replaced with a half-silvered mirror completely across the viewing window 14. Such a half-silvered mirror, as well known in the art, permits transmission of the ray $a$ directly therethrough, while also reflecting most of the light reflected through the mirror system. Thus there will be formed a pair of images, FIGS. 3$a$ and 3$b$, superimposed on each other as at 11'$a$ and 11'$b$ when the set and actual ranges of the range finder 10 are the same. However, when the actual range differs from the set range of the range finder 10, the image formed by the mirror system 16', 17 will be displaced from the image obtained through the windows 14, 19 as illustrated in FIG. 3$a$. Thus there are formed two distinct spaced images, misaligned when the set and actual ranges of the range finder 10 are in error, with the spacing thereof being a function of the error.

In accordance with the present invention there is provided an optical-electronic system that replaces the observer's eye 13 of FIG. 1. Such an optical-electronic system can recognize that actual range is either greater or less than set range and cause mirror 17 or 17' to be rotated to the proper direction until coincidence of the two images is reached. The present invention replaces the eye with an image forming optical system. In the image plane of the optical system there is placed a moving slit or slits so that light falling therethrough will be shuttered by the slits. If the object 11 is a light source, the photocell will generate a pulse each time the slit passes the image of the light. By using two photocells and/or two colors in windows, it is possible to know which image precedes the other in time and therefore how to adjust the angle $\alpha$ of mirror 17.

The invention can also use a television camera tube in place of a slit and photoelectric device arrangement. In this case the target of the camera tube is placed in the image plane of the optical system. The image is electronically scanned by the electron beam of the camera tube. The tube output will consist of pulses that can be used to tell the relative locations of the two images.

Referring now to FIGS. 4, 5 and 6, there is illustrated an application of the invention for providing a control signal when a preset range coincides with the actual range. In accordance with this application of the invention, it is desired to provide a control signal at such time as the set range on a range finder 30 and the actual range thereof coincide. This is, of course, one of the simpler applications of the principles of this invention. In accordance with this embodiment the range finder 30 includes a light source 32 directed by a light projection lens 33 in a narrow beam along path $d$ so as to strike the remote object 31 which may be earth or any other surface. The range finder 30 is of the superimposed image type and, in the manner heretofore described, forms a pair of spaced images when the set range and actual range are at a variance. A first image is provided at an image or objective lens 34 against the surface of a disc 35 where a direct line along a ray path $e$ which extends through a mirror 36 of the half-silvered type. A second image is formed by the path of rays $f$ striking a rotatable mirror 37 and projecting along line $g$ to be reflected from the fixed mirror 36 to the objective lens 34 and onto the surface of the disc 35. The disc 35 is opaque except for one or more radial slits or openings 38 contained in its surface as illustrated in FIG. 5. The disc 35 is synchronously rotated by a motor 39. Preferably the light source 32 is a light source, such as would be provided by a discharge tube, and aligned so that its image when formed on the disc surface 35 is radial, and, therefore, each slit 38 passes the image to admit the light of the image to a photodetector 45. The photodetector 45 will generate a signal or electrical pulse each time a slit of the disc passes an image of the object. In operation with any setting or angle for the mirror 37, there will be produced two images formed by the objective lens 34 except in the instance when the set distance of the range finder 30 is exactly equal to the actual distance of the range finder 30 from the object 31. In this latter case the two images will be superimposed, as illustrated in FIG. 3$b$ so that only a single image will be formed by the objective lens 34. Every time one of the slits 38 of the disc 35 passes an image of the object, there will be generated an image pulse so that when the set distance of the range finder 30 is at variance with the actual distance thereof from the object 31, there will be generated two pulses corresponding to the two misaligned images; but in the instance where the set distance of the range finder 30 corresponds identically with the actual distance of the range finder 30 from the object 31 there will be formed but a single pulse representing the superimposed images of the object. The electrical pulses generated by the photodetector 45 are transmitted to an electronic circuit which is used to detect the difference or misalignment between the images when such variance between the alignment of the images exists.

Although various types of electronic circuits may be used to detect the difference of superposition of the images, there is illustrated in FIGS. 4 and 6 one type of such electronic system which is effective to provide an output signal only at such time as the pair of images are superimposed corresponding to the situation when the set distance of the range finder 30 is equal to the actual distance of the range finder 30 from the viewed object 31.

Referring now to the block diagram of FIG. 4 and the waveform diagrams of FIG. 6, the waveform diagrams of FIG. 6 illustrate first the condition wherein the actual range and set range of the range detector are at a variance, and thereafter illustrate the condition when the set and actual ranges correspond. The electrical pulse from the photocell 45 is directed into an amplifier 50 that has enough gain to amplify the photodetector pulses to a level that will fire a Schmitt trigger 51. As illustrated in FIG. 6, the output of the Schmitt trigger provides a pip for each electrical impulse from the photocell 45. This output of the Schmitt trigger 51 activates a one shot monostable multivibrator 52 after passing through a normally open gate 53. The one shot multivibrator 52 stays in its astable state long enough for any double pulse output from the photocell 45 to be generated, but returns to its astable state before the next slit 38 in the disc 35 passes the photodetector 45. The Schmitt trigger simultaneously switches a bistable multivibrator 54 from the 1 state to the 0 state, as illustrated in FIG. 6($b$). While the bistable multivibrator 54 is in the 0 state, a normally closed gate 55 is opened and the normally open gate 53 is closed. If a second pulse is generated, the bistable multivibrator 54 is returned to the 1 state. In such case the monostable multivibrator 52 returns to its stable state without triggering the SCR output 56. However, if no second pulse is generated the bistable multivibrator 54 holds the normally closed gate 55 open until the monostable multivibrator 52 returns to its stable state. When the monostable multivibrator 52 returns to its stable state it generates an output pulse, as illustrated in FIG. 6(f), which fires through the open gate 55 and fires the SCR output 56. Firing of the SCR output 56 can be used as a signal to control a function.

The system described above has been described with reference to a superimposed image type of range detector 30. It is equally applicable with a split image range detector. As heretofore described the split image range finder is provided with a mirror which occupies only one-half of the height of the objective lens so that two images are then formed which are misaligned when the set and actual ranges are at a variance and which images are aligned when the set and actual ranges correspond. The circuit described in connection with FIGS. 4 through 6 will operate equally well with the split-image range finder as with the superimposed image range finder. However, with the split-image range finder, a second photodetector cell may be used which will not only provide a suitable signal when the set and actual ranges coincide, but will also integrate the direction and quantity of error between the ranges to provide further functions such as to provide a direct measurement of the range, or of the height during the landing process of a plane or spacecraft, or to correct the set range to the actual range. A system employing this principle is illustrated in FIG. 7.

Referring now to FIG. 7, there is illustrated an automatic readout and range measuring system using a split-image type of range detector 60. The range detector 60 is of the split-image type adapted to detect the range to some remote object such as the object 61. To this end there is provided a light source 62 projected through a light projection lens 63 to illuminate the distant object 61. Reflection of the light source 62 occurs first through an objective lens 64 against a rotating disc 65 along a light ray $h$, and secondly by reflection of the image 61 projected through the objective lens 64 by a mirror 66 receiving projected rays from a rotatable mirror 67 so that the rays from the object 61 follow a first path $j$ from the object 61 to the rotatable mirror 67 and a second path $k$ between the mirrors 67 and 66. As heretofore described, the fixed mirror 66 extends only halfway across the objective lens 64 so as to provide a first image along rays $h$ and a second image above the first along rays $j$ and $k$. The images are misaligned when the set range or angle of the rotatable mirror 67 differs from the actual range of the range detector 60, as illustrated in FIGS. 2a and 2b, but the images are aligned as illustrated in FIG. 2c when the set and actual ranges of the range detector 60 are the same.

In order to provide for directional discrimination between the misalignment or errors of the two images, as well as to show the spacing thereof, there are provided two photodetectors or photocells 70, 71. Each photodetector is aligned so that its field of view covers only one of the two images formed by the split image range finder. Moreover, as heretofore described, the disc 65 is generally opaque, with a plurality of radial slits, similar to that illustrated in FIG. 5 of the embodiment of FIGS. 4 through 6. There is thereby provided distinct image pulses to the photocells 70 and 71 as the slit in the disc 65 passes the image on the particular half of the split image. As the split in the disc passes the images of the object, each photodetector 70 and 71, therefore, generates an electrical pulse. The pulses are amplified by a pair of amplifiers 72, 73, connected, respectively, to the photocells 70 and 71. The output of the amplifiers 72 and 73 is respectively fed into Schmitt triggers 74, 75 by means of which sharp edged pulses are generated by only the positive going edge of the outputs of the amplifiers. These pulses are applied to the AND-circuit 76. If both pulses appear simultaneously, the AND-gate 76 will generate an output pulse signifying that the range setting of the range detector 60 has been reached. This output pulse can be fed into an SCR 77 if desired to provide a control or signal function.

The output pulses of the Schmitt triggers 74 and 75 may also be used to control the range setting of the range detector 60 or to provide a continuous indication of the range. For this purpose the output pulses of the Schmitt triggers 74 and 75 pass through normally open gate circuits 80, 81, respectively, and in turn transfer respective bistable multivibrators 82, 83, respectively, from the 0 or reset state to the 1 or on state. These circuits are designed so that if the output pulse of Schmitt trigger 75 precedes the output pulse of Schmitt trigger 74 in time of its appearance, then the bistable multivibrator 83 will be transferred to the 1 or on state. When bistable 83 is on, the normally open gate 80 is off so that the output pulse from the Schmitt trigger 74 will not transfer to the bistable multivibrator 82. The output pulse from the Schmitt trigger 74 will, however, reset bistable multivibrator 83. The above action is repeated on every scan of each rotated slit. A similar action takes place where the pulse output of the Schmitt trigger 74 precedes that of the Schmitt trigger 75, except that the system output pulses will now appear at the output of bistable multivibrator 82 rather than the output of bistable multivibrator 83. The output of the respective bistable multivibrators 82 and 83 are brought into detector-integrator circuits 84, 85, respectively. The output of the detector-integrator circuits 84 and 85 is a voltage gradient. An error detector 86 measures the voltage difference between the output of circuits 84 and 85. When the output of the detector-integrator 85 exceeds that of the detector-integrator 84, the pulse from the Schmitt trigger 75 precedes that from Schmitt trigger 74 and the target range or object range of the object 61 is a monotone function of the excess of the actual range from the set range of the range detector 60. As the actual range approaches the set range (or the set range increases to approach the actual range) this voltage difference reduces to zero. When the actual range equals the set range, the voltage difference output from the error detector 86 is zero and a pulse appears at the output of the AND-gate 76. This pulse may be used as an actuator or control of circuits of various types. It may also be used to reset the bistable multivibrators 82 and 83.

When the output of the detector-integrator circuit 84 exceeds that of the detector-integrator circuit 85, the pulse from the Schmitt trigger 74 precedes that from the Schmitt trigger 75 and the actual range is less than the set range of the range detector 60. The magnitude of the voltage difference again is a monotone function of the excess of the set range over the actual range. As the actual range increases to approach the set range (or the set range reduces to approach the actual range) this voltage difference reduces to zero. When the actual range equals the set range, the voltage difference output is zero and a pulse again appears at the output of the AND-circuit 76 as described above.

The output of the error detector 86 may be used with suitable servo mechanism to provide control functions. In the illustrated embodiment, this error voltage is used to drive a servo motor 90 through a suitable servo amplifier 91, which in turn rotates the mirror 67 through a gear train 92, worm gear 93, and sector gear 94 fixed to the mirror 67. The servo motor 90 will drive the mirror 67 until the actual range to the object 61 equals the set range of the range detector 60. An indicator coupled to the mirror drive system, by a remote synchro transmitter 95 if desired, can be used to indicate continuously the range measured directly.

Although the device as described above has been described with reference to visible light, it is obvious that the device may also be built to operate on infrared energy. In such application it is possible to pick up infrared radiation from a hot object without the necessity of the projection system to illuminate the object. The objective lens of the system will, of course, be one that passes infrared, for example, Linde sapphire. The photodetectors also would necessarily be suitable infrared detectors such as lead sulfide. The system can then be used for the detection of hot remote objects.

In one of its low cost applications to the photographic camera, the operator need merely point the camera at the subject and press a button. The disc will be rotated and the lens is focused from its minimum (or maximum) range setting. When the actual range of the subject is reached coincidence detector output may indicate to the operator that proper focus is achieved and will lock the lens at that range setting. Such signal could also be used to trip the shutter of the camera if desired.

The present invention also relates to an improved method for measuring the range. From the above description of specific embodiments, the method is believed clear. However, briefly, it will be understood, referring to the embodiment of FIGS. 4 through 6, that there is first formed a pair of projected images of a distant object which are aligned when the actual range of the object and the set range of the range detector is the same and which are spaced apart as a function of the variance of these ranges. The projected images are then separated into narrow image pulses by the rotating disc 35 to provide distinct image pulses. The slit 38 in the disc 35 detects the spacing of the images with respect to their alignment. This spacing of the images is converted by the photocell 45 into timed electrical pulses or an electrical signal varying in amplitude. These timed electrical pulses or the signal may be fed into a suitable electronic circuit, a form of correlation circuit, to sense the timed spacing of the electrical pulses or signal representing misalignment of the images and therefore the error of the actual and set ranges.

Although the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A space measuring system comprising:
   an optical range detector means producing a pair of projections of a remote object which are aligned when said range detector means is set to the actual range of said object and which are spaced apart as a function of the set range relative to the actual range of said object;
   means responsive to said projections creating repetitive groups of projection pulses, the projection pulses of each group being in timed spaced relation as a function of the separation of said projections and being simultaneous when said projections are aligned;
   transducer means converting said projection pulses to timed electrical pulses; and
   circuit means responsive to the spacing of said electrical pulses for providing a control signal as a function of the spacing of said electrical pulses representing deviation between the actual range of said object with the range set on said range detector means.

2. A range measuring system comprising:
   an optical range detector means producing a pair of projected images of a remote object which are aligned when said range detector means is set to the actual range of said object and which are spaced apart as a function of the set range relative to the actual range of said object;
   separating means responsive to said images creating repetitive groups of image pulses, the image pulses of each group being in timed relation as a function of the separation of said images and being simultaneous when said projections are aligned;
   a light detector converting said image pulses to timed electrical pulses; and
   circuit means responsive to the timed spacing of said electrical pulses for providing a control signal as a function of the spacing of said electrical pulses representing deviation between the actual range of said object with the range set on said range detector.

3. A range measuring system as set forth in claim 2 wherein said range detector is of the superimposed image type.

4. A range measuring system as set forth in claim 2 wherein said separating means includes a moving member with at least one slit mechanically moved across the images.

5. A range measuring system as set forth in claim 2 and including a light source projecting a light beam on said distant object, said range detector receiving reflections from said distant object.

6. A range measuring system as set forth in claim 2 wherein said range detector is of the split-image type.

7. A range measuring system as set forth in claim 6 wherein said light detector includes a pair of light responsive cells each positioned to receive the projected images from different portions of said split-image range detector.

8. A range measuring system for determining the range to a remote object comprising:
   an optical range detector means producing a pair of projected images of the remote object which are aligned when said range detector means is set to the actual range of said object and which are spaced apart as a function of the set range relative to the actual range of said object;
   separating means responsive to said images creating repetitive groups of image pulses, the image pulses of each group being in timed relation as a function of the separation of said images and being simultaneous when said projections are aligned;
   light detector converting said image pulses to timed electrical pulses; and
   circuit means responsive to the timed spacing of said electrical pulses for providing a control signal as a function of the spacing of said electrical pulses representing deviation between the actual range of said object with the range set on said range detector, said circuit means including an integrating means for detecting the spacing between said electrical impulses so as to represent the magnitude of the error between the set range and the actual range of the range detector.

9. A range measuring system as set forth in claim 8 and including servo means responsive to the integrating means for correcting the set range of said range detector to the actual range.

10. A method for measuring range comprising the steps of:
    forming a pair of projected images of a distant object which are aligned when the actual range of the object and a set range is the same and which are spaced apart as a function of the deviation of said ranges;
    separating said projected images into narrow image pulses;
    detecting the spacing of said images;
    converting the spacing of said images into timed electrical pulses; and
    sensing the timed spacing of said electrical pulses.

11. A method for measuring range as set forth in claim 10 wherein said separating step includes directing the projected images through a narrow slit in a moving member.

12. A method for measuring range as set forth in claim 10 and including the step of projecting a beam of light onto a distant object.

* * * * *